United States Patent
Lee et al.

(10) Patent No.: US 9,365,741 B2
(45) Date of Patent: Jun. 14, 2016

(54) BIODEGRADABLE SHEETS HAVING FOAMED LAYER

(75) Inventors: Si Young Lee, Cheongju-si (KR); Youn Woo Nam, Cheongju-si (KR); Gun Soo Chung, Cheongju-si (KR); Min Lee, Ansan-si (KR)

(73) Assignee: LG HAUSYS, LTD., Seoul (KR)

( * ) Notice: Subject to any disclaimer, the term of this patent is extended or adjusted under 35 U.S.C. 154(b) by 185 days.

(21) Appl. No.: 14/113,104

(22) PCT Filed: May 4, 2012

(86) PCT No.: PCT/KR2012/003512
§ 371 (c)(1),
(2), (4) Date: Oct. 21, 2013

(87) PCT Pub. No.: WO2012/157875
PCT Pub. Date: Nov. 22, 2012

(65) Prior Publication Data
US 2014/0050904 A1    Feb. 20, 2014

(30) Foreign Application Priority Data
May 13, 2011    (KR) .......................... 10-2011-0045397

(51) Int. Cl.
| | | |
|---|---|---|
| *C09D 167/04* | (2006.01) | |
| *B32B 5/18* | (2006.01) | |
| *B32B 27/06* | (2006.01) | |
| *B32B 5/32* | (2006.01) | |

(52) U.S. Cl.
CPC .............. *C09D 167/04* (2013.01); *B32B 5/18* (2013.01); *B32B 5/32* (2013.01); *B32B 27/065* (2013.01); *B32B 2266/0264* (2013.01); *B32B 2270/00* (2013.01); *B32B 2307/7163* (2013.01); *Y10T 428/24851* (2015.01)

(58) Field of Classification Search
None
See application file for complete search history.

(56) References Cited

U.S. PATENT DOCUMENTS

| | | | | |
|---|---|---|---|---|
| 2005/0003174 | A1* | 1/2005 | Ikeda | B32B 27/10 428/219 |
| 2005/0032923 | A1* | 2/2005 | Oka | C08J 3/28 521/50 |
| 2009/0258175 | A1* | 10/2009 | Matsuoka | C08J 9/0061 428/36.5 |
| 2010/0015420 | A1* | 1/2010 | Riebel | B32B 27/06 428/203 |
| 2011/0217523 | A1* | 9/2011 | Huang et al. | 428/195.1 |

FOREIGN PATENT DOCUMENTS

| | | |
|---|---|---|
| EP | 2343413 A2 | 7/2011 |
| JP | 07080979 A * | 3/1995 |
| JP | 10180973 A | 7/1998 |
| JP | 2000158576 A * | 6/2000 |

(Continued)

OTHER PUBLICATIONS

Machine translation of JP07080979 retrieved Jun. 16, 2015.*

(Continued)

*Primary Examiner* — Bruce H Hess
*Assistant Examiner* — Christopher Polley
(74) *Attorney, Agent, or Firm* — Hauptman Ham, LLP

(57) ABSTRACT

The present invention relates to sheets. The sheets include a base layer, a foamed layer formed on the base layer, a printed layer formed on the foamed layer, and a partially foamed layer formed on the printed layer. At least one layer of the foamed layer and the partially foamed layer includes a polylactic acid (PLA) resin. The sheets are biodegradable.

16 Claims, 1 Drawing Sheet

(56) References Cited

FOREIGN PATENT DOCUMENTS

| | | | |
|---|---|---|---|
| JP | 2003266549 A | 9/2003 |
| JP | 2004143432 A | 5/2004 |
| JP | 2005271504 A | 10/2005 |
| JP | 2007301823 A | 11/2007 |
| JP | 2008094871 A | 4/2008 |
| JP | 2010030288 A | 2/2010 |
| JP | 2010069852 A | 4/2010 |
| JP | 2012506502 A | 3/2012 |
| KR | 940005641 B1 | 6/1994 |
| KR | 20110032536 A | 3/2011 |
| WO | 2010050730 A2 | 5/2010 |
| WO | WO 2010050730 A2 * | 5/2010 |

OTHER PUBLICATIONS

Machine translation of JP2000158576 retrieved Jun. 16, 2015.*
Extended European Search Report dated Sep. 15, 2014.
Japanese Office Action dated Oct. 21, 2014.
International Search Report for PCT/KR2012/003512 mailed Nov. 23, 2012.
Japanese Office Action in connection with the counterpart Japanese Patent Application No. 2014-508301 mailed on Jul. 14, 2015.
Japanese Office Action in connection with the counterpart Japanese Patent Application No. 2014-508301 mailed on Mar. 31, 2015.

* cited by examiner

BIODEGRADABLE SHEETS HAVING FOAMED LAYER

CROSS REFERENCE TO RELATED APPLICATION

This application claims the priority of Korean Patent Application No. 10-2011-0045397, filed on May 13, 2011 in the Korean Patent and Trade Mark Office. Further, this application is the National Phase application of International Application No. PCT/KR2012/003512 filed on May 4, 2012, which is incorporated herein by reference in its entirety.

TECHNICAL FIELD

The present invention relates to sheets, and more particularly, to biodegradable sheets including a base layer, a foamed layer formed on the base layer, a printed layer formed on the foamed layer, and a partially foamed layer formed on the printed layer wherein at least one layer of the foamed layer and the partially foamed layer includes a polylactic acid (PLA) resin.

BACKGROUND ART

Sheets using petroleum resins such as polyvinyl chloride (PVC) are widely used in various building structures such as houses, mansions, apartments, offices, and stores.

Such sheets are produced by T-die extrusion or calendering of resins such as polyvinyl chloride (PVC). Raw materials for these sheets are exclusively derived from limited resources such as crude oil. It is thus anticipated that depletion of petroleum resources will lead to various problems related to the supply of raw materials.

As interest in environmental issues is recently growing in importance, polyvinyl chloride (PVC) sheets are problematic in that they are likely to emit harmful substances and create an environmental burden even after disposed of.

DISCLOSURE

Technical Problem

An aspect of the present invention is to provide an environmentally friendly sheet that uses a PLA resin, which can solve problems associated with the supply of raw materials of the constituent layers.

Technical Solution

In accordance with an aspect of the present invention, a biodegradable sheet includes a base layer, a foamed layer formed on the base layer, a printed layer formed on the foamed layer, and a partially foamed layer formed on the printed layer wherein at least one layer of the foamed layer and the partially foamed layer includes a PLA resin.

In accordance with another aspect of the present invention, a biodegradable sheet includes a base layer, a foamed layer formed on the base layer, a printed layer formed on the foamed layer, a partially foamed layer formed on the printed layer, and a surface-treated layer formed on the partially foamed layer wherein at least one layer of the foamed layer and the partially foamed layer includes a PLA resin.

Advantageous Effects

The biodegradable sheets of the present invention use a PLA resin derived from vegetable resources as a substitute for conventional PVC. Therefore, the present invention can solve problems associated with the supply of raw materials arising from depletion of petroleum resources.

In addition, the biodegradable sheets of the present invention emit less environmentally harmful substances such as $CO_2$ during production and are safely discarded.

Furthermore, the biodegradable sheets of the present invention are applicable to a wide range of fields, including wallpapers and interior decorative elements of buildings, and covers of electronic products and furniture.

BEST MODE

Figure 1:
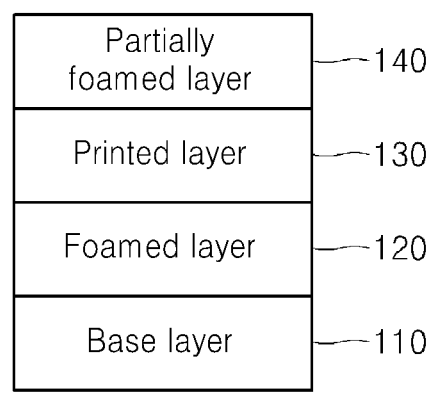
FIGS. 1 and 2 are cross-sectional views illustrating embodiments of biodegradable sheets according to the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

Hereinafter, biodegradable sheets according to preferred embodiments of the present invention will be described in detail with reference to the accompanying drawings.

Figure 2:
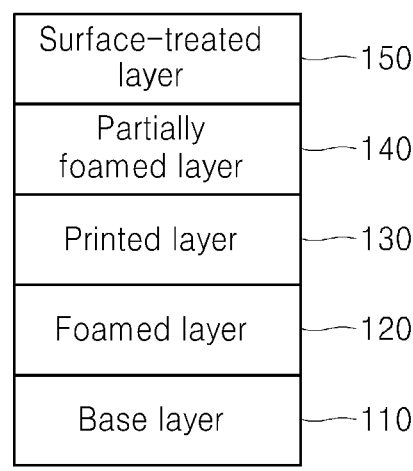

FIGS. 1 and 2 are cross-sectionals view illustrating biodegradable sheets according to embodiments of the present invention.

First, the biodegradable sheet illustrated in FIG. 1 includes a base layer 110, a foamed layer 120, a printed layer 130, and a partially foamed layer 140. At least one layer of the foamed layer 120 and the partially foamed layer 140 includes a PLA resin.

The biodegradable sheet illustrated in FIG. 2 may further include a surface-treated layer 150 formed on the partially foamed layer 140 of the biodegradable sheet illustrated in FIG. 1. At least one layer of the foamed layer 120 and the partially foamed layer 140 includes a PLA resin.

PLA resins are thermoplastic polyesters of lactide or lactic acid. For example, PLA resins may be produced by polymerization of lactic acid, which is obtained by fermentation of starch extracted from corn or potatoes. The use of PLA resins obtained from readily available renewable vegetable resources such as corn and potatoes can effectively solve problems arising from depletion of petroleum resources.

PLA resins are environmentally friendly materials that emit far fewer environmentally harmful substances such as $CO_2$ during use or when discarded than petroleum-based substances such as polyvinyl chloride (PVC), and are readily biodegradable once disposed of under natural environmental conditions.

PLA resins can be classified into crystalline PLA (c-PLA) resins and amorphous PLA (a-PLA) resins. Plasticizers may bleed toward the surface of sheets using crystalline PLA resins. In view of this phenomenon, it is preferred to use amorphous PLA resins. The use of amorphous PLA resins avoids the need to add compatibilizers, which are essential components in PVC production to prevent the occurrence of bleeding. Particularly, 100% amorphous PLA resins are most preferably used. If needed, combinations of crystalline PLA resins and amorphous PLA resins may be used.

The term "PLA resin' as used herein is intended to include a PLA resin in the form of a sol, a PLA resin blended with a bioresin, and a PLA resin blended with a synthetic resin.

First, a PLA resin in the form of a sol may be used in the biodegradable sheet of the present invention. The PLA resin in the form of a sol may be produced by adding a PLA resin to a volatile solvent to prepare a PLA solution, adding a plasticizer to the PLA solution, and drying the mixture to remove the volatile solvent. Alternatively, the PLA resin in the form of a sol may be produced by adding a plasticizer to a PLA resin in a pellet or powder form.

A blended resin of a PLA resin and a bioresin may also be used in the biodegradable sheet of the present invention. The bioresin type is not limited so long as it is biodegradable. Particularly, the bioresin is selected from cellulose, chitin, starch, polyhydroxyalkanoate (PHA), polyhydroxybutyrate valerate (PHBV), polyvinyl alcohol (PVA), polyglycolic acid (PGA), polybutylene succinate (PBS), poly(butylene adipate-co-butylene succinate) (PBSA), polybutylene adipate terephthalate (PBAT), polycaprolactone (PCL), poly(esteramide), poly(ester-urethane), and mixtures thereof. These bioresins are preferred in terms of compatibility with PLA resins and biodegradability.

Preferably, the blended resin includes 10 to 70 parts by weight of the bioresin, based on 100 parts by weight of the PLA resin. The presence of the bioresin in an amount of less than 10 parts by weight makes it difficult to expect the effects of the blend. Meanwhile, the presence of the bioresin in an amount exceeding 70 parts by weight may cause problems in terms of compatibility with other additives.

The biodegradable sheet of the present invention may also use a blended resin of a PLA resin and a synthetic resin. The synthetic resin is selected from polyvinyl chloride (PVC), polyethylene glycol (PEG), ethylene vinyl acetate (EVA), thermoplastic elastomers (TPEs), thermoplastic polyurethane (TPU), thermoplastic starch (TPS), epoxidized natural rubbers (ENRs), ionomers, styrene butadiene styrene (SBS), nitrile butadiene rubbers (NBRs), styrene ethylene butylene styrene (SEBS), acrylates, acrylonitrile butadiene styrene (ABS), polyolefin modified with compatibilizer, polyurethane (PU), polyamide, polyester, and mixtures thereof. These synthetic resins are preferred in terms of compatibility with PLA resins and biodegradability.

Preferably, the blended resin includes 10 to 70 parts by weight of the synthetic resin, based on 100 parts by weight of the PLA resin. If the synthetic resin is present in an amount of less than 10 parts by weight, blending is likely to be ineffective. Meanwhile, the presence of the synthetic resin in an amount exceeding 70 parts by weight may cause problems in terms of compatibility with other additives and may inhibit the objective of biodegradability.

A plasticizer, a processing aid and a foaming agent may be added to the PLA resin constituting the biodegradable sheet of the present invention.

The plasticizer is particularly preferably a non-phthalate plasticizer. The non-phthalate plasticizer is environmentally friendly and softens the PLA resin to achieve enhanced thermoplasticity, which facilitates molding of the PLA resin at high temperature. The non-phthalate plasticizer is preferably selected from citric acid, citrates, epoxidized vegetable oils, fatty acid esters, polyethylene glycol, polyethylene propylene glycol, and glycerol esters.

The non-phthalate plasticizer is preferably used in an amount of 10 to 50 parts by weight, based on 100 parts by weight of the PLA resin.

If the plasticizer content is less than 10 parts by weight, based on 100 parts by weight of the PLA resin, the hardness of the PLA resin may increase, resulting in poor processability. Meanwhile, if the plasticizer content exceeds 50 parts by weight, based on 100 parts by weight of the PLA resin, compatibility with the other components may be poor, causing degradation of physical properties.

The processing aid serves to increase the melt strength of the PLA resin. Low melt strength or heat resistance inherent to the PLA resin is the reason why the addition of the processing aid is preferred.

The processing aid is preferably selected from acrylic copolymers, epoxy copolymers, urethane copolymers, and polyolefin copolymers. The processing aid compensates for the melt strength of the PLA resin to facilitate processing, for example, calendering of the PLA resin.

The processing aid is preferably used in an amount of 1 to 10 parts by weight, based on 100 parts by weight of the PLA resin.

If the processing aid content is less than 1 part by weight, based on 100 parts by weight of the PLA resin, sufficient improvements in the melting efficiency and melt strength of the PLA resin are not obtained. Meanwhile, if the processing aid content exceeds 10 parts by weight, based on 100 parts by weight of the PLA resin, a rise in production costs is inevitable and poor compatibility with other materials constituting the layers of the sheet may be caused, leading to deterioration in overall physical properties of the layers.

The foaming agent is essentially added to form the foamed layer 120 and the partially foamed layer 140. Any general foaming agent may be used without particular limitation, but a thermally decomposable foaming agent undergoing an exothermic reaction is particularly preferred.

Specifically, the foaming agent is preferably selected from azodicarbonamide, azodicarboxyamide, benzenesulfonyl hydrazide, dinitrosopentamethylenetetramine, toluenesulfonyl hydrazide, azobisisobutyronitrile, barium azodicarboxylate, sodium bicarbonate, and mixtures thereof.

The foaming agent is preferably used in an amount of 0.5 to 5 parts by weight, based on 100 parts by weight of the PLA resin.

If the content of the foaming agent is less than 0.5 parts by weight, based on 100 parts by weight of the PLA resin, poor foamability is caused. If the content of the foaming agent exceeds 5 parts by weight, the strength and heat resistance of the foamed layer tend to deteriorate.

As the particle diameter of the foaming agent decreases, the thermal decomposition of the foaming agent proceeds rapidly, leaving large cells. Meanwhile, as the particle diameter of the foaming agent increases, the thermal decomposition of the foaming agent is retarded, leaving small cells. For these reasons, it is necessary to limit the particle diameter of the foaming agent. The average particle diameter of the foaming agent is preferably adjusted to 3 to 30 µm, more preferably 5 to 28 µm. Within this range, the foamed resin layer has cells whose diameter is uniform.

A filler, a lubricant, an additive or a mixture thereof may be further added to the PLA resin constituting the biodegradable sheet of the present invention.

The filler is generally added to prevent changes in the physical properties of the PLA resin composition and to reduce the production cost of the sheet. There is no restriction on the kind of the filler. The filler may be one commonly used in the art but is preferably calcium carbonate ($CaCO_3$).

The filler is preferably used in an amount of 50 to 150 parts by weight, based on 100 parts by weight of the PLA resin.

The presence of the filler in an amount of less than 50 parts by weight, based on 100 parts by weight of the PLA resin, does not contribute to cost reduction. Meanwhile, the presence of the filler in an amount exceeding 150 parts by weight may cause changes in physical properties.

The lubricant is added to prevent the PLA resin from adhering to a calender roll or a press during processing, for example, calendering of the PLA resin.

Examples of such lubricants include, but are not limited to, stearic acid, waxes, hydrocarbons, and silicone. Environmentally friendly higher fatty acids are particularly preferable in the present invention. As an example of the higher fatty acids, there may be mentioned stearic acid, which is a saturated higher fatty acid having 18 carbon atoms.

The lubricant is preferably used in an amount of 0.1 to 8 parts by weight, based on 100 parts by weight of the PLA resin.

If the lubricant content is less than 0.1 parts by weight, based on 100 parts by weight of the PLA resin, the lubricant does not exhibit any of the desired effects. Meanwhile, if the lubricant content exceeds 8 parts by weight, based on 100 parts by weight of the PLA resin, the impact resistance, heat resistance and gloss of the PLA resin may be degraded.

As the additive, there may be used, for example, a cross-linking agent, a heat stabilizer, and a foaming stabilizer.

The cross-linking agent serves to increase the molecular weight of the PLA resin through chain extension, achieving improved physical properties such as high tensile strength and heat resistance.

Examples of such cross-linking agents include, but are not necessarily limited to, diisocyanates, epoxy group-containing copolymers, and hydroxycarboxylic acid compounds.

The cross-linking agent is preferably used in an amount of 0.2 to 5 parts by weight, based on 100 parts by weight of the PLA resin.

If the content of the cross-linking agent is less than the lower limit defined above, the PLA layer may exhibit poor heat resistance. Meanwhile, if the content of the cross-linking agent exceeds the upper limit defined above, there may be an increased risk of low flexibility.

The heat stabilizer serves to prevent the mechanical properties of the PLA resin from deterioration upon foaming.

The heat stabilizer is selected from those that are non-toxic, stable at processing molding temperatures, and highly compatible with the resin without losing their activity and impeding the processability of the resin.

The heat stabilizer is preferably used in an amount of 0.1 to 10 parts by weight, based on 100 parts by weight of the PLA resin.

If the content of the heat stabilizer is less than the lower limit defined above, the PLA resin is foamed at an early stage. Meanwhile, if the content of the heat stabilizer exceeds the upper limit defined above, the physical properties of the PLA resin deteriorate.

The foaming stabilizer serves to make the size of cells uniform upon foaming.

The foaming stabilizer is preferably used in an amount of 0.1 to 5 parts by weight, based on 100 parts by weight of the PLA resin.

If the content of the foaming stabilizer is less than the lower limit defined above, the cell size may be non-uniform. Meanwhile, if the content of the foaming stabilizer exceeds the upper limit defined above, problems in physical properties may be caused.

An explanation will be given concerning the base layer 110, the foamed layer 120, the printed layer 130, the partially foamed layer 140, and the surface-treated layer 150 illustrated in FIGS. 1 and 2.

The base layer 110 is the most basic layer of the sheet and supports the overlying foamed layer 120, printed layer 130, and partially foamed layer 140.

The base layer 110 may be formed using any suitable material known in the art. Non-limiting examples of materials for the base layer 110 include vellum paper, a non-woven fabric, and a cotton fabric.

The vellum paper is composed of pulp, and the non-woven fabric is composed of a combination of pulp and polyester.

The basis weight of the vellum paper, the non-woven fabric or the cotton fabric constituting the base layer 110 is preferably from 80 to 200 g/m². If the base layer has a basis weight of less than 80 g/m², the sheet may be damaged, for example, tearing may occur during construction or in use. Meanwhile, if the base layer has a basis weight exceeding 200 g/m², the base layer becomes excessively heavy and is apt to crack and curl, making it difficult to construct the sheet.

The foamed layer 120 formed on the base layer 110 imparts an aesthetic effect to the sheet. The presence of a biodegradable PLA resin in the foamed layer 120 ensures environmental friendliness of the foamed layer.

The foamed layer 120 may use a PLA resin containing a plasticizer, a processing aid, and a foaming agent. A filler, a lubricant, an additive or a mixture thereof may be further added to the PLA resin. The composition of the components has been described above.

There is no restriction on the method for forming the foamed layer 120. For example, the foamed layer 120 may be formed by kneading the PLA resin composition, calendering or extruding the kneaded composition to produce a sheet, laminating the sheet on the base layer, and foaming the sheet in an oven.

The printed layer 130 formed on the foamed layer 120 imparts various patterns and/or colors to the sheet to further improve the aesthetics of the sheet. There is no particular restriction on the method for the formation of the printed layer. For example, the printed layer may be formed by any suitable printing technique known in the art, such as gravure printing, transfer printing, digital printing or rotary printing. The printed layer 130 may also be formed by photorealistic printing or transfer printing. The use of a known photorealistic printing technique, such as ink-jet printing, or a transfer printing technique can impart a more natural aesthetic effect in a simple manner.

The partially foamed layer 140 formed on the printed layer 130 serves to impart a three-dimensional appearance to the sheet and includes a PLA resin to ensure biodegradability.

The partially foamed layer 140 includes a PLA resin. As described above, the PLA resin may further contain a plasticizer, a processing aid, and a foaming agent. A filler, a lubricant, an additive or a mixture thereof may be further added to the PLA resin. The composition and kinds of the components have been described above.

The partially foamed layer 140 may be formed through known foaming and gelling processes. The resin composition may be partially foamed along a pattern. In this case, rotary screen printing is suitable for forming the pattern.

FIG. 2 is a cross-sectional view illustrating a biodegradable sheet according to another embodiment of the present invention.

The biodegradable sheet illustrated in FIG. 2 may further include a surface-treated layer 150 formed on the partially foamed layer 140.

The surface-treated layer 150 formed on the partially foamed layer 140 serves to improve the durability of the sheet while protecting the underlying printed layer 130 and partially foamed layer 140.

The surface-treated layer 150 may be formed using a transparent resin, such as an acrylic resin or a urethane resin.

Production of Inventive Sheets and Comparative Sheet

In the following examples and comparative example, sheets according to preferred embodiments of the present invention and a comparative sheet were produced. However, these examples are provided for illustrative purposes only and are not be construed as in any way limiting the invention.

Embodiments that are not described herein will be readily recognized and appreciated by those skilled in the art, and thus explanation thereof is omitted.

EXAMPLES

Production Methods of Constituent Layers

1. Base Layer

A base layer was formed using a non-woven fabric composed of 70% pulp and 30% polyester.

2. Formation of Foamed Layer 100 parts by weight of a PLA resin, 50 parts by weight of citric acid, 150 parts by weight of $CaCO_3$, parts by weight of an acrylic copolymer, 8 parts by weight of stearic acid, 5 parts by weight of a cross-linking agent, and 5 parts by weight of azodicarbonamide were mixed to prepare a paste. The paste was coated on the base sheet by extrusion, and passed through an oven to form a foamed layer.

3. Formation of Printed Layer

A Water-Based Ink Pigment and an Oil-Based Ink Pigment were Mixed depending on the number of printing colors. The pigment mixture was gravure printed on the resin layer to form a pattern.

4. Formation of Partially Foamed Layer 100 parts by weight of a PLA resin, 50 parts by weight of citric acid, 150 parts by weight of $CaCO_3$, 10 parts by weight of an acrylic copolymer, 8 parts by weight of stearic acid, 5 parts by weight of a cross-linking agent, and 5 parts by weight of azodicarbonamide were mixed to prepare a paste. The paste was partially coated on the printed layer using a rotary screen roll, and dried in an oven to form a partially foamed layer where a portion corresponding to the printed pattern was foamed.

5. Formation of Surface-Treated Layer 20 wt % of an acrylic resin was mixed with 80 wt % of methyl ethyl ketone to prepare a coating solution for surface treatment.

Examples 1-4

In accordance with the layer structures shown in Table 1, the constituent layers selected from the base layer, the foamed layer, the printed layer, the partially foamed layer, and the surface-treated layer were sequentially laminated to produce biodegradable sheets of Examples 1-4.

A blend of the PLA resin and a bioresin, and a blend of the PLA resin and a synthetic resin were used in Examples 2 and 3, and the compositions thereof are shown in Table 1.

Specifically, the biodegradable sheet of Example 2 was produced under the same conditions as those in Example 1, except that a blended resin of 100 parts by weight of the PLA resin and 30 parts by weight of a PBS resin was used to form the foamed layer and the partially foamed layer.

The biodegradable sheet of Example 3 was produced under the same conditions as those in Example 1, except that a blended resin of 100 parts by weight of the PLA resin and 30 parts by weight of a PVC resin was used to form the foamed layer and the partially foamed layer.

TABLE 1

| | Base layer | Foamed layer | Printed layer | Partially foamed layer | Surface-treated layer |
|---|---|---|---|---|---|
| Example 1 | ○ | ○ | ○ | ○ | |
| Example 2 | ○ | ○ PLA 100 parts by weight PBS 30 parts by weight | ○ PLA 100 parts by weight PBS 30 parts by weight | ○ | |
| Example 3 | ○ | ○ PLA 100 parts by weight PVC 30 parts by weight | ○ PLA 100 parts by weight PVC 30 parts by weight | ○ | |
| Example 4 | ○ | ○ | ○ | ○ | ○ |

Comparative Example

A base layer was formed using a base paper composed of 100% pulp. A paste including a PVC resin was coated on the base layer, and dried to produce a commercially available PVC silk sheet.

Evaluations

The sheets of Examples 1-4 and Comparative Example were evaluated with regard to the parameters shown in Table 2, and the results were compared.

TABLE 2

| | Dimensional stability | Moisture vapor permeability | Light fastness | TVOCs |
|---|---|---|---|---|
| Example 1 | ○ | ○ | ○ | ○ |
| Example 2 | Δ | ○ | Δ | ○ |
| Example 3 | ○ | Δ | ○ | ○ |
| Example 4 | ○ | ○ | ○ | ○ |
| Comparative Example | ○ | ○ | ○ | Δ |

Dimensional stability was defined as the shrinkage of the specimen, which was calculated from the difference between the length of the specimen after dipping in a water bath and the length of the specimen after standing at 80° C. Dimensional stability was evaluated to be "good (○)" when the shrinkage was less than 2.0%, "fair (Δ)" when it was 2.0-2.2%, and "poor (x)" when it was not less than 2.2%.

Moisture vapor permeability was defined as the mass of water vapor passing through the product. Moisture vapor permeability was evaluated to be "good (○)" when the mass of passing water vapor was not less than 175 g/m²·24 hr, and "poor (x)" when it was less than 175 g/m²·24 hr.

Light fastness was graded based on the criteria specified in KS M 7305. Light fastness was evaluated to be "good (○)" when the grade was not less than 4 and "poor (x)" when it was less than 4.

Environmental friendliness refers to the emission levels of total volatile organic compounds (TVOCs) and formaldehyde (HCHO). Environmental friendliness was evaluated to be "good (○)" when the TVOC and HCHO emission levels were less than 0.1 mg/m²·h and less than 0.015 mg/m²·h, respectively, "fair (Δ)" when the TVOC emission level was 0.09-0.12 mg/m²·h or the HCHO emission level was 0.013-0.017 mg/m²·h, and poor (x) when the TVOC and HCHO emission levels were not less than 0.1 mg/m²·h and not less than 0.015 mg/m²·h, respectively.

As can be seen from the results of evaluations, the dimensional stability, moisture vapor permeability, and light fastness of the inventive biodegradable sheets were sufficient to replace the PVC sheet. The inventive biodegradable sheets emitted smaller amounts of TVOCs than the PVC sheet, demonstrating superior environmental friendliness thereof.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A biodegradable sheet comprising: a base layer; a foamed layer formed on the base layer; a printed layer formed on the foamed layer; and a partially coated foamed layer formed on the printed layer, wherein at least one layer of the foamed layer and the partially coated foamed layer comprises a polylactic acid (PLA) resin and a plasticizer wherein the PLA is only amorphous PLA;
   i) the foamed layer and the partially coated foamed layer further comprise 0.5 to 5 parts by weight of a foaming agent based on 100 parts by weight of the PLA resin comprising amorphous PLA, wherein the average particle diameter of the foaming agent is 3 to 30 μm; and
   ii) the partially coated foamed layer is formed by coating and foaming a portion corresponding to the printed pattern of the printed layer.

2. A biodegradable sheet comprising: a base layer; a foamed layer formed on the base layer; a printed layer formed on the foamed layer; a partially coated foamed layer formed on the printed layer; and a surface-treated layer formed on the partially coated foamed layer, wherein at least one layer of the foamed layer and the partially coated foamed layer comprises a polylactic acid (PLA) resin and a plasticizer wherein the PLA is only amorphous PLA;
   i) the foamed layer and the partially coated foamed layer further comprise 0.5 to 5 parts by weight of a foaming agent based on 100 parts by weight of the PLA resin comprising amorphous PLA, wherein the average particle diameter of the foaming agent is 3 to 30 μm; and
   ii) the partially coated foamed layer is formed by coating and foaming a portion corresponding to the printed pattern of the printed layer.

3. The biodegradable sheet according to claim 1, wherein the PLA resin is in the form of a sol.

4. The biodegradable sheet according to claim 1, wherein at least one layer of the foamed layer and the partially coated foamed layer comprises a blended resin of a PLA resin and a bioresin.

5. The biodegradable sheet according to claim 4, wherein the bioresin is selected from the group consisting of cellulose, chitin, starch, polyhydroxyalkanoate (PHA), polyhydroxybutyrate valerate (PHBV), polyvinyl alcohol (PVA), polyglycolic acid (PGA), polybutylene succinate (PBS), poly(butylene adipate-co-butylene succinate) (PBSA), polybutylene adipate terephthalate (PBAT), polycaprolactone (PCL), poly (ester-amide), poly(ester-urethane), and mixtures thereof.

6. The biodegradable sheet according to claim 1, wherein at least one layer of the foamed layer and the partially coated foamed layer comprises a blended resin of a PLA resin and a synthetic resin.

7. The biodegradable sheet according to claim 6, wherein the synthetic resin is selected from the group consisting of polyvinyl chloride (PVC), polyethylene glycol (PEG), ethylene vinyl acetate (EVA), thermoplastic elastomers (TPEs), thermoplastic polyurethane (TPU), thermoplastic starch (TPS), epoxidized natural rubbers (ENRs), ionomers, styrene butadiene styrene (SBS), nitrile butadiene rubbers (NBRs), styrene ethylene butylene styrene (SEBS), acrylates, acrylonitrile butadiene styrene (ABS), polyolefin modified with compatibilizer, polyurethane (PU), polyamide, polyester, and mixtures thereof.

8. The biodegradable sheet according to claim 1 or claim 2, wherein at least one layer of the foamed layer and the partially coated foamed layer further comprises a processing aid, a foaming agent, or a mixture thereof.

9. The biodegradable sheet according to claim 1 or claim 2, wherein at least one layer of the foamed layer and the partially coated foamed layer comprises 10 to 50 parts by weight of a plasticizer, 1 to 10 parts by weight of a processing aid, and 0.5 to 5 parts by weight of a foaming agent, based on 100 parts by weight of the PLA resin.

10. The biodegradable sheet according to claim 8, wherein at least one layer of the foamed layer and the partially coated foamed layer further comprises a filler, a lubricant, a cross-linking agent, a heat stabilizer, a foaming stabilizer, or a mixture thereof.

11. The biodegradable sheet according to claim 10, wherein the partially coated foamed layer comprises 50 to 150 parts by weight of the filler, 0.1 to 8 parts by weight of the lubricant, 0.2 to 5 parts by weight of the cross-linking agent, 0.1 to 10 parts by weight of the heat stabilizer, and 0.1 to 5 parts by weight of the foaming stabilizer, based on 100 parts by weight of the PLA resin.

12. The biodegradable sheet according to claim 2, wherein the PLA resin is in the form of a sol.

13. The biodegradable sheet according to claim 2, wherein at least one layer of the foamed layer and the partially coated foamed layer comprises a blended resin of a PLA resin and a bioresin.

14. The biodegradable sheet according to claim 2, wherein at least one layer of the foamed layer and the partially coated foamed layer comprises a blended resin of a PLA resin and a synthetic resin.

15. The biodegradable sheet according to claim 1 or claim 2, wherein at least one layer of the foamed layer and the partially coated foamed layer further comprises a processing aid, a foaming agent, or a mixture thereof.

16. The biodegradable sheet according to claim 1 or claim 2, wherein at least one layer of the foamed layer and the partially coated foamed layer comprises 10 to 50 parts by weight of a plasticizer, 1 to 10 parts by weight of a processing aid, and 0.5 to 5 parts by weight of a foaming agent, based on 100 parts by weight of the PLA resin.

* * * * *